July 2, 1957            E. G. PODOLAN            2,797,958
ABUTTING FRONT AND REAR DOOR WINDOW-SEAL
CONSTRUCTION FOR HARD TOP SEDANS
Filed Jan. 17, 1955
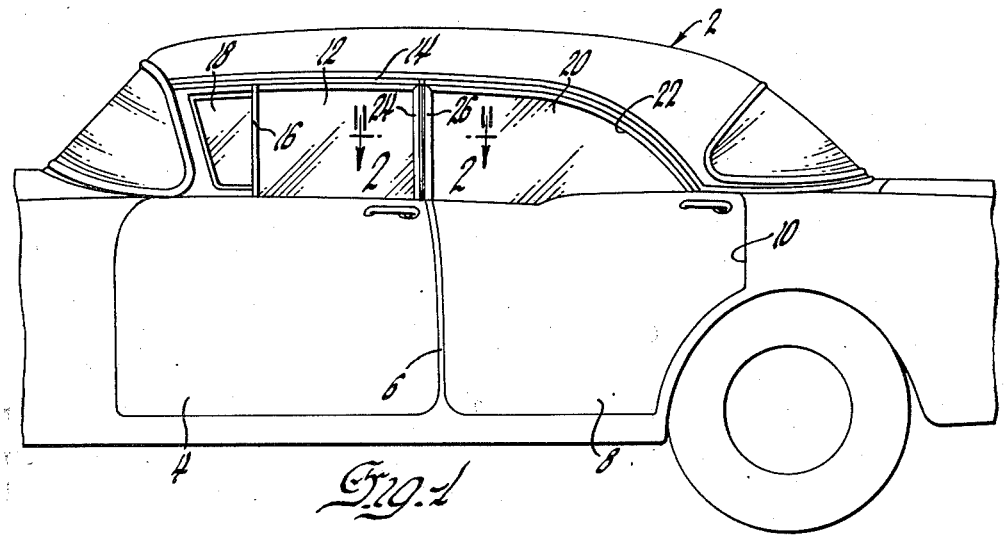
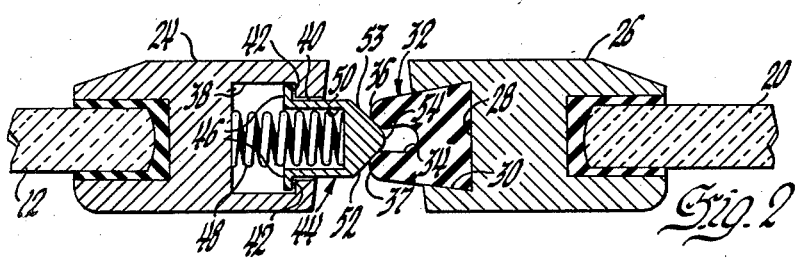
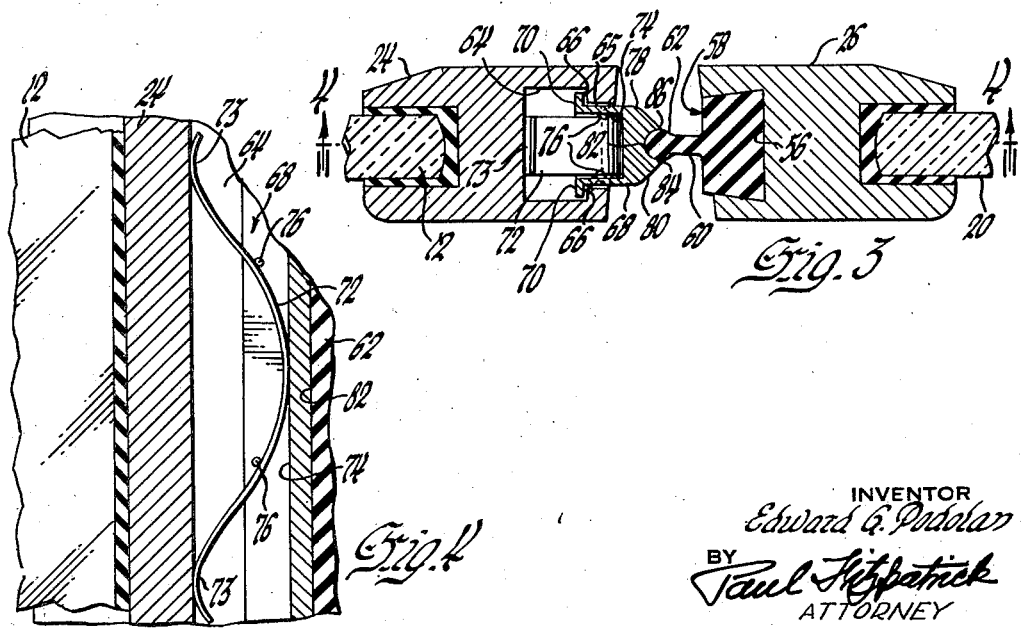
INVENTOR
Edward G. Podolan
BY Paul Fitzpatrick
ATTORNEY United States Patent Office 2,797,958
Patented July 2, 1957

2,797,958

ABUTTING FRONT AND REAR DOOR WINDOW-SEAL CONSTRUCTION FOR HARD TOP SEDANS

Edward G. Podolan, Detroit, Mich., assignor to General Motors Corporation, Detroit, Mich., a corporation of Delaware Application January 17, 1955, Serial No. 482,137

6 Claims. (Cl. 296—44)

This invention relates to a seal and more particularly a seal between vehicle windows having edge portions located in spaced juxtaposed position.

The recently introduced four-door hard top sedan has no center pillar above the body belt line and no door window frames above the body belt line, except for the ventipane window frame extending upwardly to the roof rail at the forward portion of the front door and pivotally supporting a ventipane window. This results in a continuous window opening from the ventipane window to the rear quarter area of the body when the front and rear door windows are in down position. The front door window seals against the roof rail and the ventipane window frame in up position, and the rear door window seals against the roof rail and overlaps the center pillar in up position. The front and rear door windows are mounted within the window frames with the rear window frame member of the front door window and the front window frame member of the rear door window located in spaced juxtaposed position when both windows are in up position and both doors are closed. Since there is no center pillar above the body belt line, a seal must be provided between the aforementioned window frame members in order to exclude the elements from the interior of the vehicle.

The front door and the rear door swing outwardly of the body when open, the front door being hinged at its forward edge to the body and the rear door being hinged at its forward edge to the center pillar. Thus, the seal must allow either door to open and close or both doors to be opened and closed together with the windows in up position and still provide effective sealing in the closed position of the doors. This invention provides such a seal which does not interfere with opening and closing of the vehicle doors when the windows are in up position and provides effective sealing in the closed position of the doors.

An object of this invention is to provide a seal between vehicle windows having edge portions located in spaced juxtaposed position. Another object of this invention is to provide a seal between vehicle door windows having edge portions located in spaced juxtaposed position which allows either or both doors to be opened and closed and yet provides effective sealing in the closed position of the doors.

These and other objects of this invention will be readily apparent from the following specification and the drawings, in which:

Figure 1 is a side elevational view of a four-door hard top sedan incorporating a seal according to this invention;

Figure 2 is a cross sectional view on the plane indicated by line 2—2 of Figure 1 showing one embodiment of the seal;

Figure 3 is a cross sectional view on the plane indicated by line 2—2 of Figure 1 showing another embodiment of the seal; and Figure 4 is a sectional view on the plane indicated by line 4—4 of Figure 3.

Referring now to Figure 1 of the drawings, a vehicle body 2 includes a front door 4 hinged at its forward edge to the body and latched at its rearward edge to the center pillar 6, and a rear door 8 hinged at its forward edge to the center pillar 6 and latched at its rearward edge 10 to the vehicle body. The center pillar 6 extends only from the floor of the vehicle to the body belt line, which is the top edge of the front and rear doors. A front window 12 mounted within a window frame 14 is supported within door 4 by a suitable window regulator for movement between open and closed positions. Window 12 seals against the roof rail 14 in closed position and also against the rear member 16 of the ventipane window frame extending upwardly at the forward portion of door 4 to the roof rail and pivotally supporting a ventipane window 18. The rear window 20 mounted within a window frame 22 is supported within door 8 by a suitable window regulator. It seals against the roof rail 14 and overlaps the center pillar 6 in closed position. Thus, in the closed position of the doors and the windows, the rear window frame member 24 of the front window frame 14 and the forward window frame member 26 of the rear window frame 22 are disposed in spaced juxtaposed position. Since the center pillar 6 does not extend above the body belt line, a seal must be provided between window frame members 24 and 26 in order to exclude the elements from the interior of the vehicle.

Referring now to Figure 2 of the drawings, one embodiment of the seal of this invention will be described. The window frame member 26 defines a channel 28 extending the length of the window frame member, with the sides 30 of the channel being oblique to the base of the channel. An elongated sealing member 32 of frustro-conical cross section fits within channel 28 and extends forwardly of the vehicle body from window frame member 26. The edge portion of sealing member 32 includes two rounded lips 36 and 37 defining between them a groove 34. The sealing member may be made of hard rubber, vinyl resin, nylon, or polyethylene resins such as Teflon, nylon and Teflon being preferred because of their low coefficients of friction.

The window frame member 24 defines a T-slot 38 extending the length of the window frame member having an opening 40 narrower than slot 38 to define shoulders 42. A metal sealing member 44 having flanges 46 fits within channel 38 and is biased rearwardly of the vehicle body from window frame member 24 by a number of coil compression springs 48 fitting within vertically spaced bores 50 in the sealing member. Flanges 46 abut against shoulders 42 in the extreme rearward position of the sealing member to provide a positive stop. The edge of the sealing member is formed by oblique surfaces 52 and 53 terminating in a blunt nose 54 which fits within groove 34 in the closed position of the doors as shown in Figure 2.

The operation of the seal will now be described as either or both doors are opened and closed. Assuming now that the front door 4 is swung outwardly of the vehicle body to open position, the surface 52 of sealing member 44 will initially slide along lip 37 of sealing member 32 and cam sealing member 44 within slot 38 of window frame member 24 against the action of springs 48 to withdraw nose 54 from sealing engagement within groove 34 of sealing member 32. After nose 54 slides around lip 37, springs 48 will bias sealing member 44 to its extreme rearward position. When the front door is closed, surface 53 will initially slide along lip 37 of sealing member 32 and cam sealing member 44 within slot 38 against the action of springs 48. This allows nose 54 to slide around lip 37 into sealing engagement within groove 34. Springs 48 continuously resist movement of sealing member 44 within slot 38 so that oblique surfaces 52 and 53 and nose 54 are always in wiping or sliding contact with lip 37 as the front door is initially opened or finally closed.

When the rear door 8 is swung outwardly of the body to open position, rounded lip 37 slides outwardly of the vehicle body along surface 52 to cam sealing member 44 within slot 38 against the action of springs 48 and withdraw nose 54 from sealing engagement within groove 34. Springs 48 return sealing member 44 to its extreme rearward position. As the door is closed, lip 37 slides inwardly of the vehicle body along surface 52 to cam sealing member 44 within slot 38 against the action of springs 48 so that nose 54 can be returned into sealing engagement within groove 34 by springs 48.

If both doors are opened or closed at the same time, then the action of the sealing members will remain substantially as described, except that the movement of sealing member 44 within slot 38 of window frame member 24 will be somewhat greater during the initial opening and final closing movements of the doors. The use of the rounded lips 36 and 37 and the blunt nose 54 reduces the area of sliding contact between the sealing members as the doors are opened or closed and thus reduces wear, since there is only tangential contact between the sealing members. Depending on the location of the pivotal axis of the rear door 8 and its inclination, if any, to the vertical, lip 37 may slide inwardly or outwardly of the vehicle body as the rear door 8 is opened or closed or may be moved rearwardly and forwardly with respect to sealing member 44 as the rear door is opened and closed. Since the seal is symmetrical, it will work with equal success in all of these arrangements.

Referring now to Figures 3 and 4 of the drawings, another embodiment of this invention will be described. Window frame member 26 is provided with an undercut channel 56 extending the length of the window frame member and an elongated sealing member 58 having a base portion of cross section similar to the cross section of channel 56 is mounted within the channel. A substantially rigid web 60 extends forwardly from the base portion of sealing member 58 and terminates in a bead or rounded edge 62. Sealing member 58 may be made of the same materials as sealing member 32.

The window frame member 24 is provided with a slot 64 extending the length of the window frame member and having an opening 65 of smaller width than the slot to define a pair of opposite shoulders 66. A sealing member 68 having flanges 70 fits within slot 64 and is biased rearwardly by a number of vertically spaced curved leaf springs 72 having curved ends 73 bearing against the base of slot 64, as can be seen in Figure 4. These flat springs fit within a channel 74 extending the length of the sealing member, with projections 76 extending inwardly from the walls of the channel to retain the springs in position. Flanges 70 engage shoulders 66 in the extreme rearward position of sealing member 68 to provide a positive stop. The terminal portion of sealing member 68 defines oblique surfaces 78 and 80 and a groove 82 of semi-circular cross section having rounded lips 84 and 86 extending the length of the sealing member. Groove 82 receives bead 62 of sealing member 58 in the closed position of the doors as shown in Figure 3.

When the front door 4 is opened, sealing member 68 is cammed within slot 64 of window frame member 24 against the action of springs 72 as groove 82 and lip 86 slide around bead 62 to disengage the sealing members. The rounded lip 86 prevents cutting of bead 62. When door 4 is closed, oblique surface 78 of sealing member 68 slides over bead portion 62 and cams sealing member 68 within slot 64 against the action of springs 72 until lip 86 slides over the bead and the bead enters groove 82, with springs 72 urging the sealing members into sealing engagement.

When the rear door 8 is opened, bead 62 cams sealing member 68 within slot 64 against the action of springs 72 as it slides out of channel 82 and over lip 84 to disengage the sealing members. Springs 72 return sealing member 68 to its extreme rearward position. As the door is closed, bead 62 slides along surface 80 to cam sealing member 68 within slot 64 against the action of springs 72 and then slides over lip 84 into groove 82, with springs 72 urging the sealing members into sealing engagement. When both doors are opened or closed the action of the sealing members remains substantially the same as described, except that sealing member 68 is moved a somewhat greater distance within slot 64 as the doors are initially opened or finally closed. Depending on the location of the pivotal axis of the rear door 8 and its inclination, if any, to the vertical, bead 62 may slide inwardly or outwardly of the vehicle body as the rear door 8 is opened or closed or may be moved rearwardly and forwardly with respect to the sealing member 68 as the rear door is opened and closed. Since the seal is symmetrical, it will work with equal success in all of these arrangements.

Although the seal of this invention has been illustrated and described in conjunction with the four-door hard top sedan having a center pillar extending to the body belt line, it should also be noted that both embodiments of this seal may be used with equal success on pillarless vehicles wherein the front door is hinged at its forward edge to the vehicle body and the rear door is hinged at its rearward edge of the vehicle body, with the window frame members in the same relationship as herein described. The operation of the seal will be somewhat different, but since it is symmetrical it will work equally well in either type of vehicle.

While a specific embodiment of this invention has been shown and described, various changes and modifications may be made within the scope and spirit of the invention.

I claim:

1. The combination comprising a vehicle body, a pair of doors swingably mounted on said body for movement between open and closed positions, window frame members supported by said doors in juxtaposed position in the closed position of said doors, sealing members supported by said window frame members and having terminal portions facing longitudinally of said body, one of said terminal portions having a groove receiving the other of said terminal portions in abutting sealing engagement in the closed position of said doors, resilient means urging one of said sealing members longitudinally of said body, and means for moving said one of said sealing members longitudinally of said body against the action of said resilient means as said doors are moved from open to closed position to allow said groove in said one of said terminal portions to receive said other of said terminal portions in the closed position of said doors.

2. The combination comprising a vehicle body, a pair of doors swingably mounted on said body for movement between open and closed positions, window frame members supported by said doors in juxtaposed position in the closed position of said doors, sealing members supported by said window frame members and having terminal portions facing longitudinally of said body, one of said terminal portions having a groove receiving the other of said terminal portions in abutting sealing engagement in the closed position of said doors, resilient means urging one of said sealing members longitudinally of said body, and means for moving said one of said sealing members longitudinally of said body against the action of said resilient means upon initial engagement of said sealing members as said doors are moved from open to closed position to allow said groove in said one of said terminal portions to receive the other of said terminal portions in the closed position of said doors, said means including cam surfaces on one of said sealing members engageable by the other of said sealing members.

3. The combination comprising a vehicle body including doors swingable between open and closed positions, window frame members supported by said doors in juxtaposed position in the closed position of said doors, a first elongated sealing member supported by one of said window frame members having a groove and oblique surfaces adjacent said groove, a second elongated sealing member supported by the other of said window frame members having a terminal portion fitting within said groove in the closed position of said doors to seal the space between said window frame members, and resilient means biasing one of said sealing members longitudinally of said body into engagement with the other of said sealing members in the closed position of said doors whereby as either of said doors is swung from open to closed position said terminal portion of said second sealing member will engage an oblique surface of said first sealing member and cam said one of said sealing members longitudinally of said body against the action of said resilient means, said resilient means resisting movement of said one of said sealing members and urging said terminal portion of said second sealing member into abutting sealing engagement with said groove of said first sealing member after said terminal portion of said second sealing member has engaged said groove.

4. The combination comprising a vehicle body, a pair of doors swingably mounted on said body for movement between open and closed positions, window frame members supported by said doors in juxtaposed position in the closed position of said doors, sealing members supported within said window frame members and having terminal portions extending longitudinally of said body from said window frame members, one of said terminal portions having a groove receiving the other of said terminal portions in abutting sealing engagement in the closed position of said doors, resilient means urging one of said sealing members longitudinally of said body and outwardly of said window frame member supporting said sealing member, and means for moving said one of said sealing members longitudinally of said body and inwardly within said window frame member supporting said sealing member against the action of said resilient means upon initial engagement of said sealing members as either of said doors is moved from open to closed position to allow said groove in said one of said terminal portions to receive the other of said terminal portions in the closed position of said doors, said means including cam surfaces on one of said sealing members engageable by the other of said sealing members.

5. The combination comprising a vehicle body, a pair of doors swingably mounted on said body for movement between open and closed positions, window frame members supported by said doors in juxtaposed position in the closed position of said doors, a first elongated sealing member supported by one of said window frame members having terminal rounded lips defining a groove, a second elongated sealing member supported by the other of said window frame members having a terminal nose portion fitting within said groove in the closed position of said doors, resilient means urging said second sealing member longitudinally of said body and outwardly of said window frame member supporting said sealing member, one of said terminal lips being engageable with said nose portion of said second sealing member to cam said second sealing member inwardly within said window frame member supporting said second sealing member against the action of said resilient means upon initial engagement of said sealing members as one of said doors is moved from open to closed position to allow said groove in said first sealing member to receive said nose portion of said second sealing member in the closed position of said doors.

6. The combination comprising a vehicle body, a pair of doors swingably mounted on said body for movement between open and closed positions, window frame members supported by said doors in juxtaposed position in the closed position of said doors, a first elongated sealing member supported by one of said window frame members having a terminal nose portion including a circular groove, a second elongated sealing member supported by the other of said window frame members having a web portion terminating in a bead edge fitting within said groove of said first sealing member in the closed position of said doors, resilient means urging said first sealing member longitudinally of said body and outwardly of said window frame member supporting said sealing member, said bead edge engaging said terminal nose portion of said first sealing member and moving said first sealing member longitudinally of said body and inwardly within said window frame member supporting said first sealing member against the action of said resilient means upon initial engagement of said sealing members as one of said doors is moved from open to closed position to allow said groove in said first sealing member to receive said bead edge of said second sealing member in the closed position of said doors.

References Cited in the file of this patent

UNITED STATES PATENTS

| 1,317,410 | Anderson | Sept. 30, 1919 |
| 1,962,809 | Conway | June 12, 1934 |

FOREIGN PATENTS

| 260,056 | Great Britain | Oct. 28, 1926 |
| 276,684 | Great Britain | Mar. 8, 1928 |
| 419,740 | Great Britain | Nov. 19, 1934 |
| 454,352 | Great Britain | Sept. 29, 1936 |
| 176,787 | Switzerland | Nov. 16, 1935 |